US00RE36619E

United States Patent [19]

Schmidt et al.

[11] E Patent Number: Re. 36,619

[45] Reissued Date of Patent: Mar. 21, 2000

[54] ROTARY HOPPER FOR AN ATTACHING APPARATUS

[75] Inventors: Volker Schmidt; Erich A. Schmidt, both of Lexington, Ky.

[73] Assignee: Eastlex Machine Corporation, Lexington, Ky.

[21] Appl. No.: 08/819,660

[22] Filed: Mar. 17, 1997

Related U.S. Patent Documents

Reissue of:

[64] Patent No.: 5,603,442
Issued: Feb. 18, 1997
Appl. No.: 08/522,764
Filed: Sep. 1, 1995

[51] Int. Cl.[7] ..... B65G 29/02

[52] U.S. Cl. ..... 227/119; 227/112; 227/137; 227/139

[58] Field of Search ..... 227/119, 112, 227/137, 107, 109, 114, 45, 15, 18, 117, 139; 221/266, 268, 234, 296

[56] References Cited

U.S. PATENT DOCUMENTS

| | | | |
|---|---|---|---|
| 3,298,585 | 1/1967 | Mohrke et al. | 227/119 |
| 3,946,926 | 3/1976 | Willis | 227/112 |
| 4,037,771 | 7/1977 | Peterson | 227/130 |
| 4,901,431 | 2/1990 | Gast | 227/2 |
| 4,907,718 | 3/1990 | Emmerich | 227/135 |
| 5,005,752 | 4/1991 | Obst | 227/114 |
| 5,014,876 | 5/1991 | Young et al. | 227/112 |
| 5,427,297 | 6/1995 | Tymianski | 227/135 |
| 5,480,087 | 1/1996 | Young et al. | 227/119 |

*Primary Examiner*—Scott A Smith
*Attorney, Agent, or Firm*—Frank C. Leach, Jr.

[57] ABSTRACT

A rotary hopper includes a door, which is pivotally mounted on the main mounting plate for pivoting about a vertical axis, having a transparent element to enable viewing of the interior of the rotary hopper. The pivotally mounted door enables easy access to the interior of the hopper. On the opposite side of the main mounting plate from the door, a shaft is supported for rotatably supporting a cone having a gauging ring with gauging grooves mounted thereon. A recess in the cone, the interior of the gauging ring, and the interior of the transparent element on the door form a reservoir in the rotary hopper for the fastener elements. On the side of the main mounting plate having the door, the main mounting plate has a vertical groove to receive the fastener element in each of the gauging grooves when each of the gauging grooves is aligned therewith during rotation of the gauging ring. The vertical groove communicates with a setting station of an attaching apparatus.

29 Claims, 7 Drawing Sheets

ROTARY HOPPER FOR AN ATTACHING APPARATUS

Matter enclosed in heavy brackets [ ] appears in the original patent but forms no part of this reissue specification; matter printed in italics indicates the additions made by reissue.

This invention relates to a rotary hopper for use with an attaching apparatus that attaches two mating fastener elements to each other and to a material in which each of two rotary hoppers contains one of the two mating fastener elements and, more particularly, to a rotary hopper in which a user is able to view the fastener elements therein and have easy access to the interior of the rotary hopper for removing or adding fastener elements.

Fastener elements occasionally are defective, particularly when a fastener element is a ring having projections such as legs or prongs extending therefrom along its inner diameter, for example. For example, a leg or prong may not be perpendicular to the body of the ring. This can occur during manufacture of the fastener element or in the hopper through the fastener element engaging other fastener elements therein so as to be subjected to a force sufficient to bend the leg or prong, for example. When this occurs, the defective fastener element cannot pass through the gauging gate, and the supply of fastener elements to the setting station eventually ceases.

It has been found that a hopper usually has several defective fastener elements therein when it is full so that the operator must stop the attaching apparatus several times during each use of all the fastener elements within the hopper. It should be understood that the operator normally would not refill the hoppers until one of the hoppers is exhausted of the fastener elements therein.

The stopping of the attaching apparatus to remove the defective fastener element blocking the gauging gate can be reduced if the number of the gauging gates is increased since only one of the gauging gates needs to be open for an uninterrupted supply of the fastener elements to the setting station. The number of the gauging gates can be significantly increased by utilizing a rotary hopper having a plurality of gauging grooves in a gauging ring with each gauging groove being rotated to a position at which a fastener element in the gauging groove may be supplied to feed means during a cycle of operation of the attaching apparatus.

The use of the gauging grooves, which constitute gauging gates, substantially increases the opportunity for the continued supply of fastener elements to the setting station of the attaching apparatus without having to stop operation of the attaching apparatus even when some of the gauging grooves are blocked by defective fastener elements. However, the previously suggested rotary hoppers had no access to the interior of the rotary hopper except by disassembly, which is time consuming. This disassembly is required to even view the interior of the rotary hopper.

It has previously been suggested in U.S. Pat. No. 5,005,752 to Obst to provide quicker and easier access to the interior of a rotary hopper without disassembly of the rotary hopper. The rotary hopper of the aforesaid Obst patent has a vertically disposed frame structure, which has an upper portion of a working mechanism pivotally attached thereto for pivoting about a horizontal axis. The working mechanism has a rotatable gauging ring with a plurality of equally angularly spaced gauging grooves therein. An upper portion of a pivotally mounted container is pivotally mounted on the opposite side of the frame structure from the working mechanism for pivoting about the same horizontal axis as the working mechanism. The working mechanism is rotatably supported by a support, which is on the opposite side of the frame structure from the working mechanism and disposed within the container.

Thus, access to the interior of the rotary hopper of the aforesaid Obst patent is obtained by pivoting the working mechanism and/or the container. However, the rotary hopper of the aforesaid Obst patent has disadvantages.

One disadvantage of the rotary hopper of the aforesaid Obst patent is that the vertically disposed frame structure rubs against each fastener element, which is disposed within each of the gauging grooves in the rotatable gauging ring of the working mechanism, when the gauging ring rotates. If a fastener element is painted, this rubbing action causes paint to be removed from the fastener element so that the fastener element is no longer satisfactory. Accordingly, the rotary hopper of the aforesaid Obst patent may not be satisfactorily used when the fastener elements are painted.

Another disadvantage of the aforesaid Obst patent is that an operator cannot view the entire interior of the rotary hopper even when the pivotally mounted container is transparent without pivoting the working mechanism to its open position. Therefore, the operator does not have any knowledge of the number of fastener elements, if any, remaining within the interior of the rotary hopper and must pivot each of the container and the working mechanism about the same horizontal axis to open positions to obtain access to the interior of the rotary hopper.

A further disadvantage of the rotary hopper of the aforesaid Obst patent is that protrusion of the support, which rotatably supports the working mechanism of the rotary hopper, into the container reduces the volume of the rotary hopper's reservoir. Therefore, it is necessary for the operator of the attaching apparatus using the rotary hoppers of the aforesaid Obst patent to stop operation more frequently to replenish the supply of the fastener elements in the rotary hopper of the aforesaid Obst patent because of the smaller reservoir.

Still another disadvantage of the aforesaid Obst patent is that the fastener elements will fall out of both the container and the working mechanism when each is pivoted to its open position. This is because both the container and the working mechanism pivot about the same horizontal axis to positions in which the fastener elements fall by gravity out of the container and the working mechanism as stated in the aforesaid Obst patent. It is impractical to have fastener elements with prongs, for example, on a factory floor since these could injure workers.

The rotary hopper of the present invention overcomes the disadvantages of the rotary hopper of the aforesaid Obst patent while still obtaining the advantage of the increased number of gauging gates to significantly reduce the number of times that the attaching apparatus must be stopped for an operator to clear the gauging gates so that supply of the fastener elements to the setting station is not stopped. That is, since each of the gauging grooves constitutes a gauging gate, nearly all of the gauging grooves would have to be blocked before there would be an insufficient supply of the fastener elements to the setting station of the attaching apparatus.

The rotary hopper of the present invention has a viewing arrangement in which the operator of the attaching apparatus can see at least the portions of the interior of the rotary hopper having the fastener elements to be supplied to the gauging grooves and a vertical groove into which the fastener elements fall by gravity from the gauging grooves. Thus, access to the interior of the rotary hopper is not necessary to view portions of the interior.

Access to the interior of the rotary hopper is much easier in the rotary hopper of the present invention through the pivotally mounted door providing easy access by the door being pivoted about a vertical axis. Because the door is pivoted about a vertical axis, only a limited number, if any, depending on the quantity present, of the fastener elements in the transparent element, which is part of the rotary hopper's reservoir, will fall out of the transparent element on the door.

The rotary hopper of the present invention has a support arrangement for a rotatable cone disposed on the opposite side of a main mounting plate from the remainder of the rotary hopper. This support arrangement does not protrude into the hopper reservoir to enable an increase in the volume of the reservoir. Accordingly, the rotary hopper of the present invention will hold a substantially larger number of fastener elements than the rotary hopper of the aforesaid Obst patent.

An object of this invention is to increase the output of a fastener attaching apparatus.

Another object of this invention is to reduce the possibility of a feed fastener element from a hopper being stopped by jamming of the fastener elements.

A further object of this invention is to provide a rotary hopper having a viewable interior.

Still another object of this invention is to provide a rotary hopper having a reservoir viewable without any access to the reservoir.

Other objects of this invention will be readily perceived from the following description, claims, and drawings.

This invention relates to a rotary hopper for fastener elements including a cone rotatably supported by support means. A gauging ring is fixed to the cone for rotation therewith. The gauging ring has a plurality of gauging grooves therein with the gauging grooves being equally angularly spaced around the gauging ring. A cover ring is rotatable with the gauging ring so that there is no relative movement therebetween. The cover ring overlies each of the gauging grooves adjacent at least its outlet to form a separate passage through which a fastener element in each of the gauging grooves can fall therefrom by gravity. Receiving means at a fixed position receives a fastener element from each of the gauging grooves having a fastener element therein during rotation of the gauging ring by movement of each of the gauging grooves past the receiving means so that a fastener element in each of the gauging grooves may fall by gravity into the receiving means. Preventing means prevents a fastener element in each of the gauging grooves from falling therefrom by gravity except when the gauging groove is disposed so that the fastener element therein may fall by gravity into the receiving means. Movable means, which provides access to the interior of the rotary hopper, includes viewing means for viewing the interior of the rotary hopper. The viewing means is capable of holding fastener elements for supply to each of the gauging grooves.

The attached drawings illustrate preferred embodiments of the invention, in which.

Figure 4:
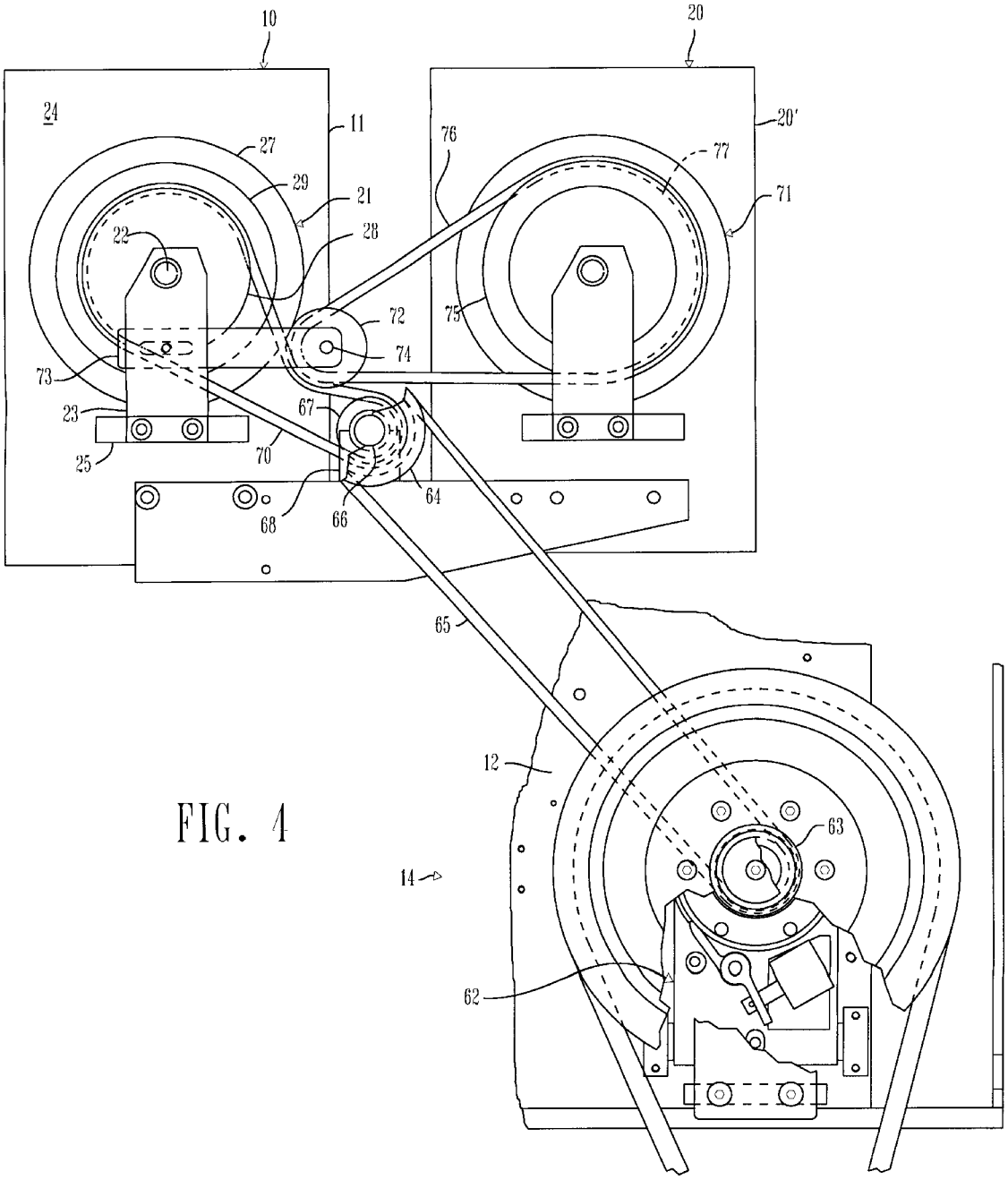
FIG. 4 is a side elevational view of a portion of an attaching apparatus having a pair of rotary hoppers of the present invention and showing a drive arrangement therefor.
Figure 5:
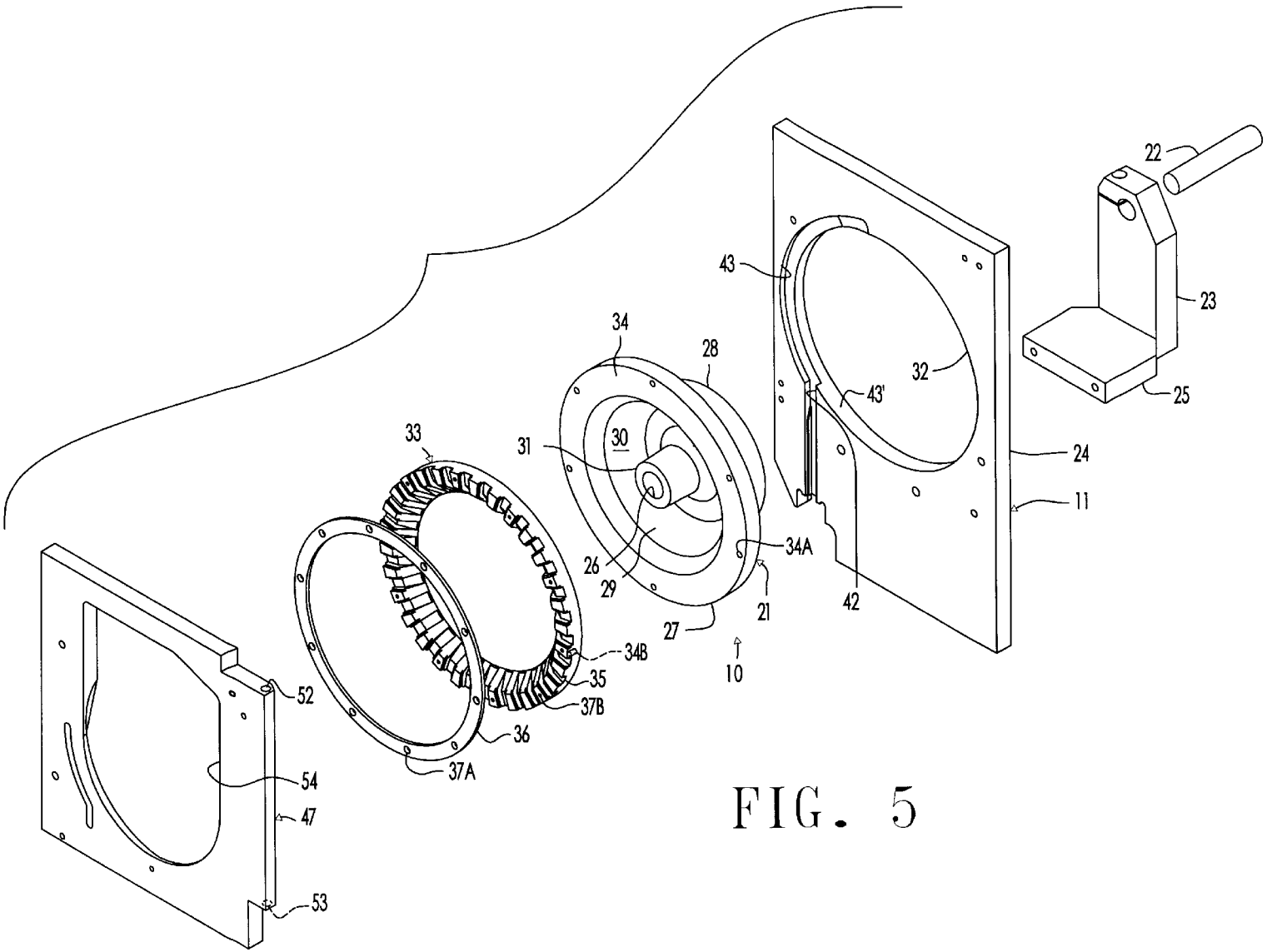
FIG. 5 is an exploded perspective view of portions of the rotary hopper of FIG. 1.

Referring to the drawings and particularly FIG. 5, there is shown a rotary hopper 10 including a main mounting plate or support 11. The main mounting plate or support 11, which is substantially vertical, is supported by a plate-like support 12 (see FIG. 4) of an attaching apparatus 14. The attaching apparatus 14 is shown and described in U.S. Pat. No. 5,319,848 to Schmidt et al, which is incorporated by reference herein.

As shown and described in the aforesaid Schmidt et al patent, the attaching apparatus 14 attaches two mating fastener elements such as a socket 15 (see FIG. 7) and a ring 16 attached to each other with a material 17 therebetween. The socket 15 includes an annular recess 18 (see FIG. 8) to receive prongs or legs 19 (see FIG. 7) extending from the ring 16 when the socket 15 and the ring 16 are attached to each other by the attaching apparatus 14 (see FIG. 4) of the aforesaid Schmidt et al patent.

Figure 7:
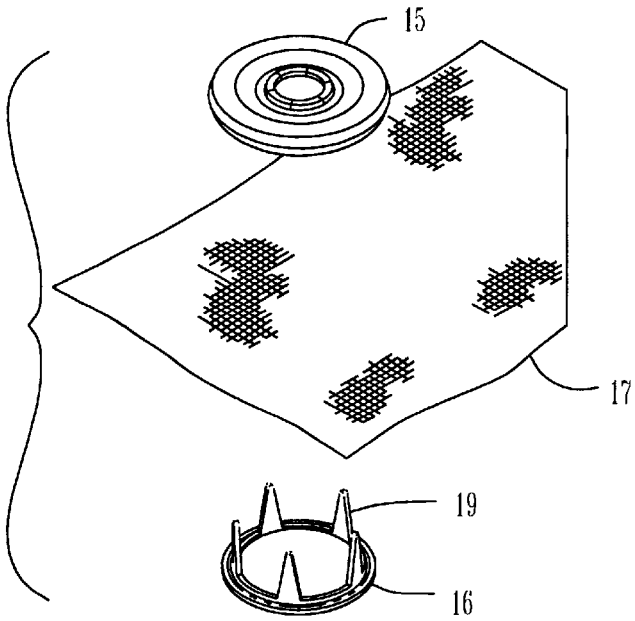
FIG. 7 is a perspective view of a socket, a ring having prongs to which a socket is to be attached, and a material through which the prongs pass when the socket and the ring are attached to each other.
Figure 8:
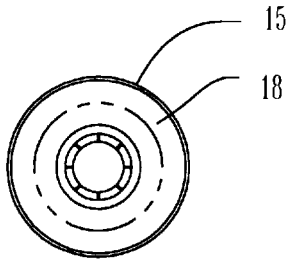
FIG. 8 is a plan view of one side of one of the fastener elements of FIG. 7.

The rotary hopper 10 contains the rings 16 (see FIG. 7). A rotary hopper 20 (see FIG. 4) contains the sockets 15 (see FIG. 8).

The rotary hopper 20 (see FIG. 4) includes a main mounting plate 20'. The main mounting plate 20' also is supported by the plate-like support 12 of the attaching apparatus 14.

The rotary hopper 10 has a cone 21 (see FIG. 5) rotatably mounted on a shaft 22. The shaft 22 is fixed to a vertical support bracket 23, which is attached to a surface 24 of the main mounting plate 11 by a horizonal support plate 25.

The shaft 22 extends through an axial passage 26 in the cone 21. Thus, the shaft 22 rotatably supports the cone 21. Since the shaft 22 is supported by the main mounting plate 11, the cone 21 is rotatably supported by the main mounting plate 11.

The cone 21 includes a first cylindrical portion 27 and a second cylindrical portion 28 joined to each other by a conical shaped portion 29 extending from the inner diameter of the first cylindrical portion 27 of the cone 21 to the outer diameter of the second cylindrical portion 28. This provides a recess 30 within the inner diameter of the first cylindrical portion 27 of the cone 21 to form a portion of a reservoir in the rotary hopper 10.

Figure 9:
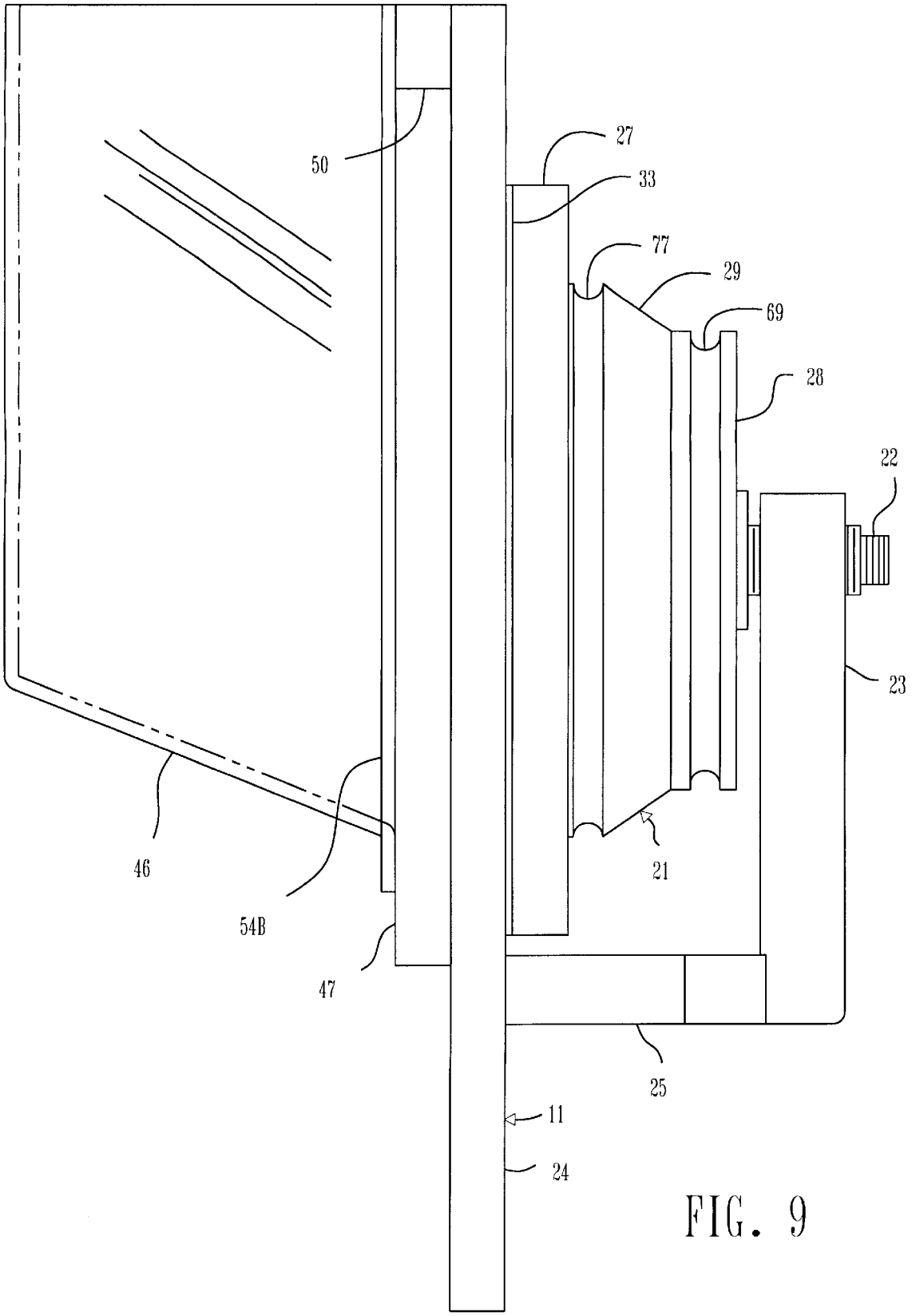
FIG. 9 is a front elevational view of the rotary hopper of FIG. 1.

The axial passage 26 extends through a projection 31 on the second cylindrical portion 28 and through the second cylindrical portion 28 to receive the shaft 22. As shown in FIG. 9, the cone 21 does not extend into the plane of the main mounting plate 11 so that the cone 21 does not extend into a circular opening 32 (see FIG. 5) in the main mounting plate 11.

A gauging ring 33 is fixed to an end surface or face 34 of the first cylindrical portion 27 of the cone 21 by screws (not shown) extending through holes 34A in the first cylindrical portion 27 of the cone 21 into threaded holes 34B in the gauging ring 33. Most of the gauging ring 33 is disposed within the opening 32 in the main mounting plate 11 but a small portion extends beyond the main mounting plate 11 as shown in FIG. 9.

The gauging ring 33 (see FIG. 5) has a plurality of equally angularly spaced gauging grooves 35 formed therein. Each of the gauging grooves 35 is on a radius extending through the centers of the gauging ring 33 and the shaft 22 since these are coincident.

Figure 6:
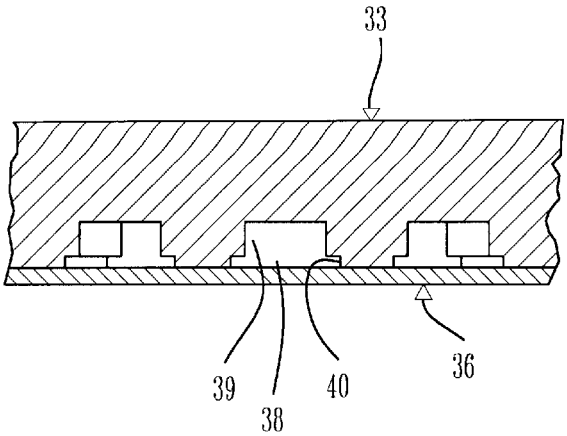
FIG. 6 is a fragmentary sectional view of a portion of a gauging ring and a cover ring of the rotary hopper of FIG. 1.

A cover ring 36 is fixed to the gauging ring 33 by screws 37 (see FIG. 1) extending through holes 37A (see FIG. 5) in the cover ring 36 into threaded holes 37B in the gauging ring 33. The cover ring 36 overlies the outer portion of the gauging ring 33 to form a passage 38 (see FIG. 6) adjacent the outlet end of each of the gauging grooves 35 (see FIG. 5) in the gauging ring 33. The passage 38 (see FIG. 6) is formed so that the prongs or legs 19 (see FIG. 7) of the ring 16 will be disposed in a deeper portion 39 (see FIG. 6) of smaller diameter of the passage 38 while a shallow enlarged area 40 of larger diameter of the passage 38 adjacent the cover ring 36 receives the flat portion of the ring 16 (see FIG. 7).

Figure 1:
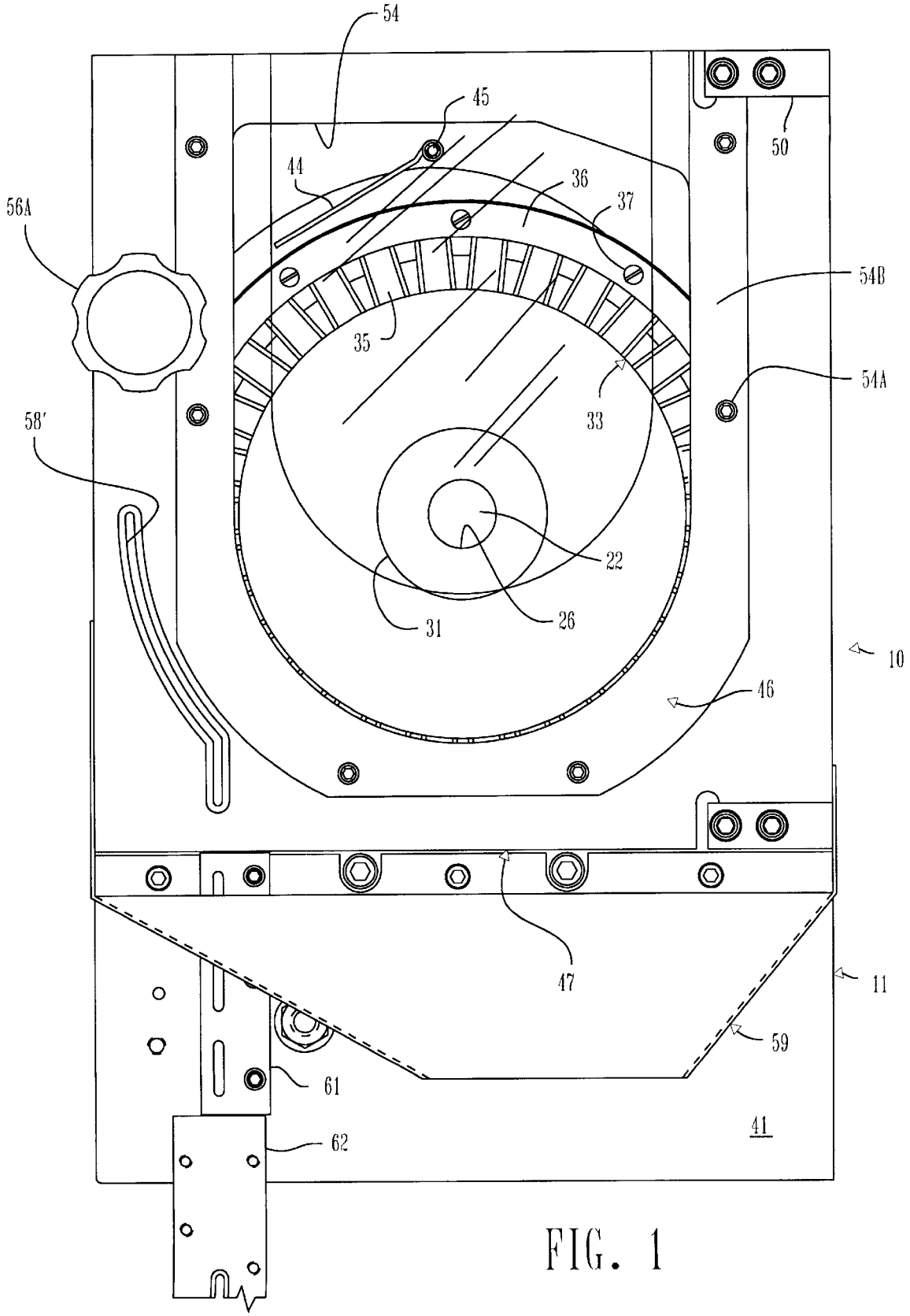
FIG. 1 is a side elevational view of one embodiment of a rotary hopper of the present invention in which a ring is the fastener element disposed therein.

As shown in FIG. 1, the size of each of the gauging grooves 35 is constant from the inner diameter of the gauging ring 33. Each of the rings 16 (see FIG. 7) slides down the gauging groove 35 (see FIG. 1) by gravity when the gauging groove 35 reaches a position below the horizontal diameter of the gauging ring 33.

A surface 41 (see FIG. 2) of the main mounting plate 11 has a vertical groove 42 formed therein at about the 7:30 o'clock position of the cover ring 36. The vertical groove 42 receives the ring 16 (see FIG. 7) within the gauging groove 35 (see FIG. 2) when the gauging groove 35 is at a position at which the ring 16 (see FIG. 7) may fall from the passage 38 (see FIG. 6) by gravity into the vertical groove 42 (see FIG. 2).

If the ring 16 (see FIG. 7) cannot enter the vertical groove 42 (see FIG. 2) because it is either not aligned properly to fall by gravity into the vertical groove 42 or the vertical groove 42 is full, the ring 16 (see FIG. 7) will enter an arcuate groove 43 (see FIG. 2) during clockwise rotation of the gauging ring 33. The arcuate groove 43 extends from the top of the vertical groove 42 to about the 12 o'clock position before the diameter of the arcuate groove 43 is reduced.

As shown in FIG. 5, the opening 32 in the main mounting plate 11 has a wider or thicker surface 43' prior to the vertical groove 42. The wider surface 43' begins when the arcuate groove 43 ceases. Thus, the wider surface 43' extends from about the 1 o'clock position to the 7:30 o'clock position. The wider surface 43' prevents the ring 16 (see FIG. 7) from falling out of the passage 38 (see FIG. 6) by gravity prior to the vertical groove 42 (see FIG. 2).

A wire 44 is pivotally mounted on a pin 45 extending from the surface 41 of the main mounting plate 11 for projection into the arcuate groove 43 prior to the diameter of the arcuate groove 43 reducing. The wire 44 causes the rings 16 (see FIG. 7), which reach the wire 44 (see FIG. 2), to be removed from the arcuate groove 43 and fall into the interior of the gauging ring 33 and into the recess 30 (see FIG. 5) in the cone 21 and/or into the interior of a transparent element 46 (see FIG. 1) on a door 47.

The surface 41 (see FIG. 2) of the main mounting plate 11 has a pair of vertical pivot pins 48 and 49 supported thereon. The pivot pin 48 is mounted on a block 50, which is attached to the surface 41 of the main mounting plate 11. The pivot pin 49 is supported by a block 51, which is mounted on the surface 41 of the main mounting plate 11.

The door 47 (see FIG. 3) has longitudinal recesses 52 and 53 therein to receive the pivot pins 48 (see FIG. 2) and 49, respectively, to pivotally mount the door 47 (see FIG. 3) on the main mounting plate 11 (see FIG. 2) for pivoting about a vertical axis. The door 47 (see FIG. 5) has an opening 54 therein over which is mounted the transparent element 46 (see FIG. 1). The transparent element 46 is secured to the door 47 by screws 54A passing through a flange 54B of the transparent element 46 into threaded holes in the door 47.

As shown in FIG. 9, the transparent element 46 is open at its upper end to allow the supply of the rings 16 (see FIG. 7) thereto. The transparent element 46 (see FIG. 1) has its portion facing the opening 54 in the door 47 completely open so that the rings 16 (see FIG. 7) can flow from the interior of the transparent element 46 (see FIG. 9) through the opening 54 (see FIG. 5) into the interior of the gauging ring 33 and the interior of the recess 30 in the cone 21.

The transparent element 46 (see FIG. 1) allows viewing therethrough and through the opening 54 in the door 47 into the interior of the rotary hopper 10. This enables an operator to see the number of the rings 16 (see FIG. 7) disposed in the rotary hopper 10 (see FIG. 1) between the transparent element 46 and the recess 30 (see FIG. 5) within the cone 21. This volume of space constitutes the reservoir to supply the rings 16 (see FIG. 7) to each of the gauging grooves 35 (see FIG. 2) in the gauging ring 33.

When the door 47 (see FIG. 1) is in its closed position, an arcuate groove 55 (see FIG. 3) in its inner surface 56 overlies the cover ring 36 (see FIG. 5) since the cover ring 36 is not disposed within the opening 32 in the main mounting plate 11. The cover ring 36 must be positioned so that the ring 16 (see FIG. 7) may fall from the passage 38 (see FIG. 6), which is defined by the cover ring 36 (see FIG. 2) overlying the outer portion of the gauging grooves 35 in the gauging ring 33, into the vertical groove 42.

The door 47 (see FIG. 1) is held in its closed position by a hand screw 56A being disposed within a threaded hole 56B (see FIG. 2) in the surface 41 of the main mounting plate 11. Thus, the door 47 (see FIG. 1) is releasably locked to the main mounting plate 11.

The vertical groove 42 (see FIG. 2) has ribs 57 extending from opposite sides of its bottom surface 58 and its side walls. The legs or prongs 19 (see FIG. 7) of the ring 16 ride inside of the ribs 57 (see FIG. 2) while the substantially flat body of the ring 16 (see FIG. 7) rides on the top surface of the ribs 57 (see FIG. 2) inside of the side walls of the vertical groove 42.

The door 47 (see FIG. 3) has a slot 58' extending therethrough to overlie a portion of the vertical groove 42 (see FIG. 2) in the main mounting plate 11 and a portion of the arcuate groove 43 in the main mounting plate 11. This enables the operator to determine if the rings 16 (see FIG. 7) are at least in the vertical groove 42 (see FIG. 2) so as to still be feeding the rings 16 (see FIG. 7) to the setting station of the attaching apparatus 14 (see FIG. 4).

As shown in FIG. 1, a sheet metal member 59 is supported on the surface 41 of the main mounting plate 11 to form a chute having its bottom open. The chute receives any of the rings 16 (see FIG. 7) that fall from the interior of the transparent element 46 (see FIG. 1) or the interior of the gauging ring 33 or the recess 30 (see FIG. 5) in the cone 21 when the door 47 (see FIG. 1) is opened. The operator places a box below the bottom of the chute to receive any of the rings 16 (see FIG. 7) that fall into the chute.

A cover plate 61 (see FIG. 2) is fixed to the surface 41 of the main mounting plate 11 and overlies a portion of the vertical groove 42 to form a passage through which the ring 16 (see FIG. 7) falls until it enters a feed chute 62 (see FIG. 2) from which it is supplied to a guide channel of the attaching apparatus 14 (see FIG. 4) in the manner more particularly shown and described in the aforesaid Schmidt et al patent. As shown in FIG. 1, the cover plate 61 has its upper end terminate at the bottom surface of the door 47.

The cone 21 (see FIG. 5) is rotated a partial revolution each time that a one revolution clutch 62 (see FIG. 4) is activated in the manner more particularly shown and described in the aforesaid Schmidt et al patent. The one revolution clutch 62 produces counterclockwise (as viewed in FIG. 4) rotation of a pulley 63 to rotate a pulley 64 counterclockwise through a belt 65.

The pulley 64 is connected through a shaft 66 to a pulley 67. The shaft 66 is rotatably supported on a bracket 68, which stands between the main mounting plate 11 of the rotary hopper 10 and the main mounting plate 20' of the rotary hopper 20.

Figure 2:
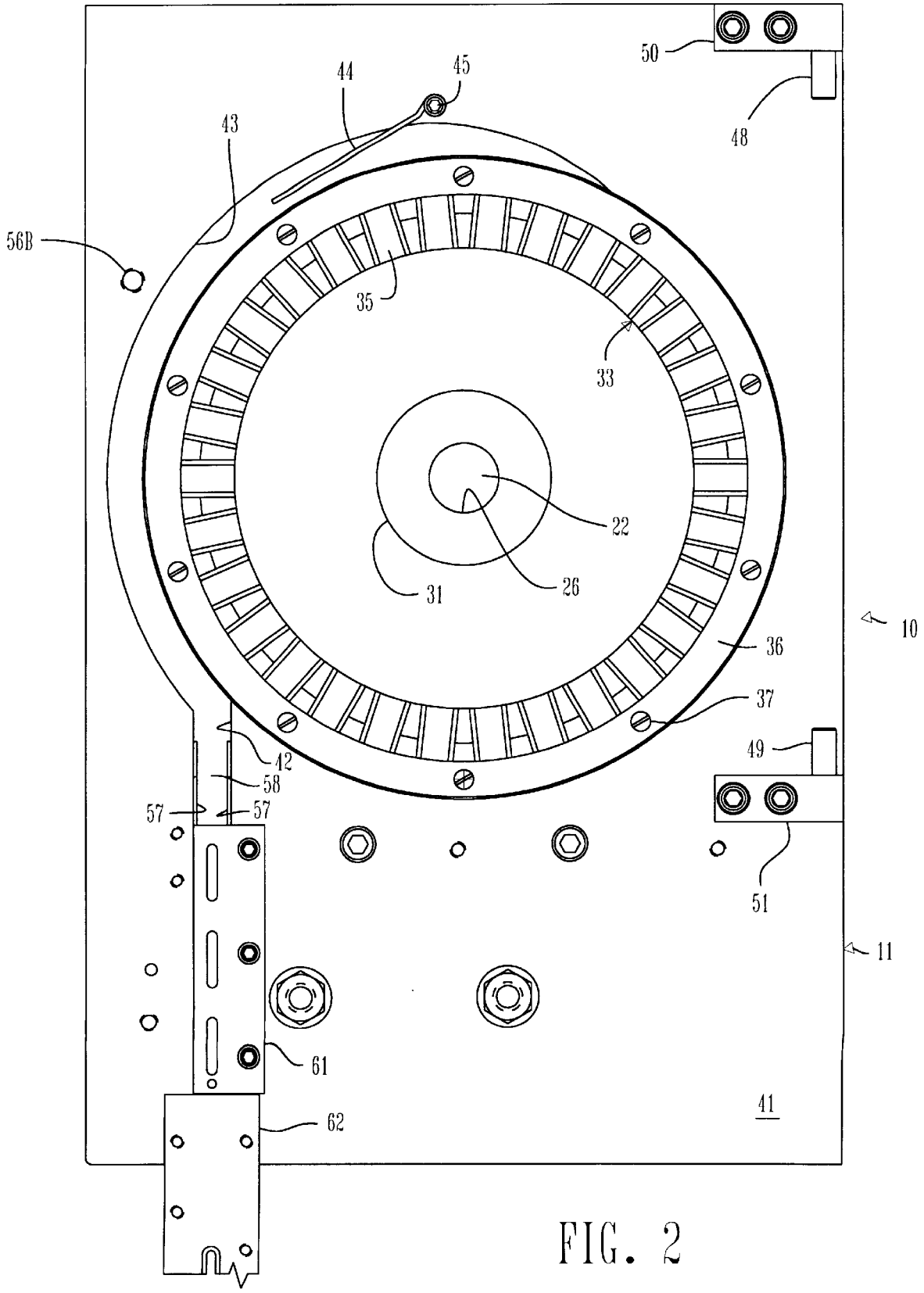
FIG. 2 is a side elevational view of the rotary hopper of FIG. 1 with its pivotally mounted door removed.
Figure 3:
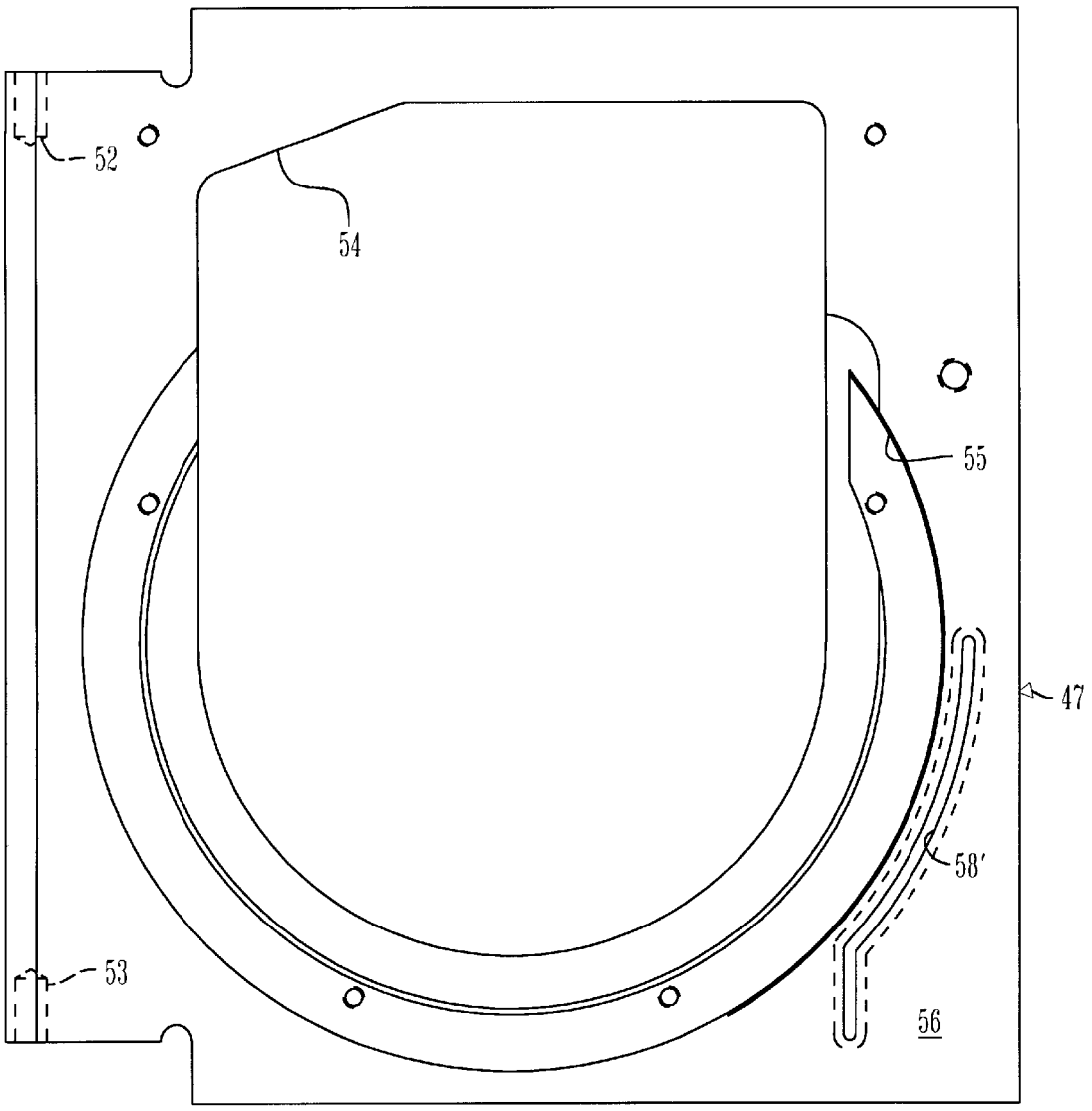
FIG. 3 is an elevational view of the inside of the pivotally mounted door of the rotary hopper of FIG. 1.

The counterclockwise rotation of the pulley 67 causes the cone 21 to rotate counterclockwise in FIG. 4 and clockwise in FIGS. 1–3. The second cylindrical portion 28 (see FIG. 9) of the cone 21 has a groove 69 to receive a belt 70 (see FIG. 4), which also passes around the pulley 67, so that the second cylindrical portion 28 of the cone 21 functions as a pulley.

The rotary hopper 20, which has the sockets 15 (see FIG. 7) therein, has its cone 71 (see FIG. 4), which is the same as the cone 21, rotated clockwise through a pulley 72, which is rotated clockwise by the belt 70. The pulley 72 is rotatably mounted on a bracket 73 through its shaft 74. The bracket 73 is adjustably mounted on the vertical support bracket 23.

The pulley 72 is connected to a second cylindrical portion 75 of the cone 71 by a belt 76 riding in a groove 77 in the second cylindrical portion 75 of the rotary hopper 20. The groove 77 is shown in the cone 21 in FIG. 9 since the cones 21 and 71 (see FIG. 4) are the same as previously mentioned.

Figure 10:
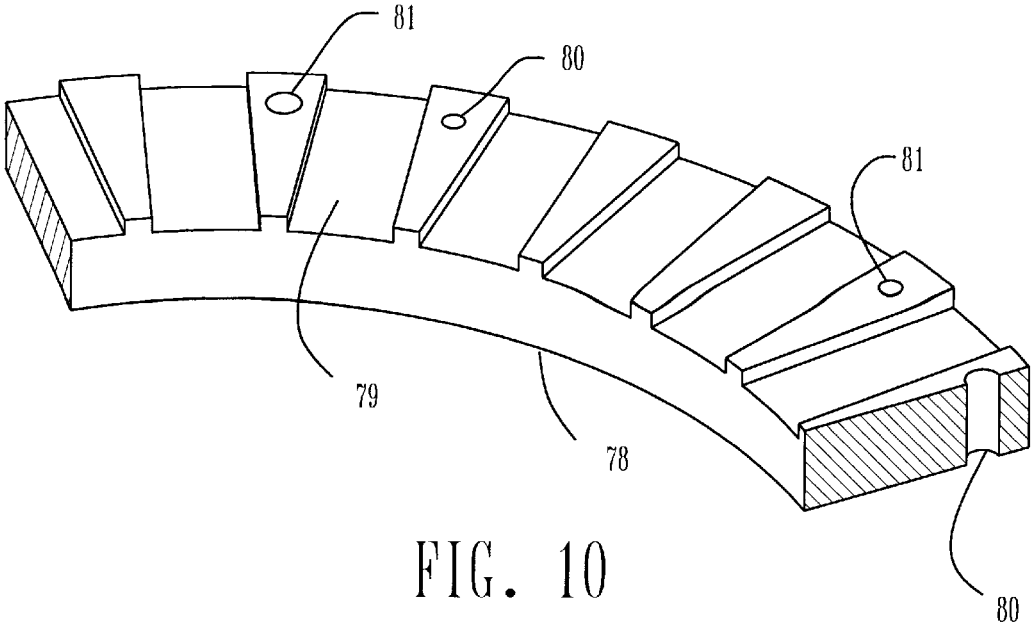
FIG. 10 is a fragmentary perspective view, partly in section, of a portion of a gauging ring of another form of the rotary hopper of the present invention for fastener elements complementary to the fastener elements in the rotary hopper of FIG. 1.

The rotary hopper 20 is the same as the rotary hopper 10 except that the rotary hopper 20 has a gauging ring 78 (see FIG. 10) formed with each of its gauging grooves 79, which receive the sockets 15 (see FIG. 7), passing through the center of the gauging ring 78 (see FIG. 10). The gauging ring 78 has threaded holes 80 to receive screws (not shown) for attaching the gauging ring 78 to the cone 71 (see FIG. 4) in the same manner as the gauging ring 33 (see FIG. 5) is attached to the cone 21. The gauging ring 78 (see FIG. 10) has threaded holes 81 to receive screws (not shown) that fix the cover ring 36 (see FIG. 5) thereto by extending through the holes 37A in the cover ring 36.

It should be understood that the rotary hopper 10 (see FIG. 4) may have the gauging ring 33 (see FIG. 5) formed with each of the gauging grooves 35 not passing through the center of the gauging ring 33. It also should be understood that the rotary hopper 20 (see FIG. 4) may have the gauging ring 78 (see FIG. 10) formed with each of the gauging grooves 79 not passing through the center of the gauging ring 78.

It is not necessary for the cone 21 (see FIG. 5) to have the recess 30 therein although it is preferred. It should be understood that the slot 58' (see FIG. 1) may be a plurality of spaced holes rather than a continuous slot.

An advantage of this invention is that there is no rubbing of a fastener element when it is fed from a rotary hopper. Another advantage of this invention is that there is ready access to the interior of a rotary hopper by an operator of an attaching apparatus.

For purposes of exemplification, particular embodiments of the invention have been shown and described according to the best present understanding thereof, However, it will be apparent that changes and modifications in the arrangement and construction of the parts thereof may be resorted to without departing from the spirit and scope of the invention.

We claim:

1. A rotary hopper for fastener elements including:

a cone;

support means for rotatably supporting said cone;

a gauging ring fixed to said cone for rotation therewith;

said gauging ring having a plurality of gauging grooves therein, said gauging grooves being equally angularly spaced around said gauging ring;

a cover ring rotatable with said gauging ring so that there is no relative movement therebetween, said cover ring overlying each of said gauging grooves adjacent at least its outlet to form a separate passage for each of said gauging grooves through which a fastener element in each of said gauging grooves can fall therefrom by gravity;

receiving means at a fixed position for receiving a fastener element from each of said gauging grooves having a fastener element therein during rotation of said gauging ring by movement of each of said gauging grooves past said receiving means so that a fastener element in each of said gauging grooves may fall by gravity into said receiving means;

preventing means for preventing a fastener element in said passage for each of said gauging grooves from falling therefrom by gravity except when said gauging groove is disposed so that the fastener element therein may fall by gravity into said receiving means;

movable means for providing access to the interior of said rotary hopper;

and said movable means including viewing means for viewing the interior of said rotary hopper, said viewing means being capable of holding fastener elements for supply to each of said gauging grooves.

2. The rotary hopper according to claim 1 including a recess in said cone, said recess being smaller than an inner diameter of said gauging ring to hold fastener elements for supply to each of said gauging grooves.

3. The rotary hopper according to claim 2 in which said viewing means includes a transparent element capable of holding fastener elements for supply to each of said gauging grooves and enabling viewing of at least some of said gauging grooves.

4. The rotary hopper according to claim 3 in which each of said gauging grooves is radially aligned with the axis of rotation of said cone.

5. The rotary hopper according to claim 4 in which said preventing means includes blocking means for blocking said passage for each of said gauging grooves when a fastener element therein can fall therefrom by gravity except when said receiving means can receive the fastener element falling by gravity.

6. The rotary hopper according to claim 3 in which said preventing means includes blocking means for blocking said passage for each of said gauging grooves when a fastener element therein can fall therefrom by gravity except when said receiving means can receive the fastener element falling by gravity.

7. The rotary hopper according to claim 2 in which:

said movable means includes a door pivotally mounted on said support means for pivotal movement about a substantially vertical axis for closing access to said recess in said cone;

said door has an opening;

and said viewing means includes a transparent element mounted on said door and enclosing said opening in said door, said transparent element being capable of holding fastener elements for supply to said gauging grooves.

8. The rotary hopper according to claim 7 in which each of said gauging grooves is radially aligned with the axis of rotation of said cone.

9. The rotary hopper according to claim 8 in which said preventing means includes blocking means for blocking said passage for each of said gauging grooves when a fastener element therein can fall therefrom by gravity except when said receiving means can receive the fastener element falling by gravity.

10. The rotary hopper according to claim 7 in which said preventing means includes blocking means for blocking said passage for each of said gauging grooves when a fastener element therein can fall therefrom by gravity except when said receiving means can receive the fastener element falling by gravity.

11. The rotary hopper according to claim 2 in which said preventing means includes blocking means for blocking said passage for each of said gauging grooves when a fastener element therein can fall therefrom by gravity except when said receiving means can receive the fastener element falling by gravity.

12. The rotary hopper according to claim 1 in which said preventing means includes blocking means for blocking said passage for each of said gauging grooves when a fastener element therein can fall therefrom by gravity except when said receiving means can receive the fastener element falling by gravity.

13. A rotary hopper for fastener elements including:

a cone;

a substantially vertical plate for rotatably supporting said cone;

a gauging ring fixed to said cone for rotation therewith;

said gauging ring having a plurality of gauging grooves therein, said gauging grooves being equally angularly spaced around said gauging ring;

said substantially vertical plate having a substantially circular opening;

said gauging ring being disposed in said substantially circular opening;

a cover ring rotatable with said gauging ring so that there is no relative movement therebetween, said cover ring overlying each of said gauging grooves adjacent at least its outlet to form a separate passage for each of said gauging grooves through which a fastener element in each of said gauging grooves can fall therefrom by gravity;

said cover ring being disposed exterior of said substantially vertical plate on one side thereof;

a vertical groove in said one side of said substantially vertical plate communicating with said substantially circular opening in said substantially vertical plate and extending downwardly therefrom for receiving a fastener element from each of said gauging grooves having a fastener element therein during rotation of said gauging ring by movement of each of said gauging grooves past said vertical groove so that a fastener element in each of said gauging grooves may fall by gravity into said vertical groove;

preventing means for preventing a fastener element in said passage for each of said gauging grooves from falling therefrom by gravity except when said gauging groove is disposed so that the fastener element therein may fall by gravity into said vertical groove;

said preventing means including said substantially vertical plate having a thickness greater than each of said passages so as to block each of said passages from at least the position on the circumference of said substantially circular opening in said substantially vertical plate at which a fastener element may fall by gravity from said gauging groove until said vertical groove communicates with said substantially circular opening in said substantially vertical plate;

movable means for providing access to the interior of said rotary hopper;

and said movable means including viewing means for viewing the interior of said rotary hopper, said viewing means being capable of holding fastener elements for supply to each of said gauging grooves.

14. The rotary hopper according to claim 13 including said substantially vertical plate having means extending from its opposite side and supported by said substantially vertical plate for rotatably supporting said cone.

15. The rotary hopper according to claim 14 in which:

said movable means includes a door pivotally mounted on said one side of said substantially vertical plate for pivoting about a vertical axis;

and said door has:

an opening;

and a transparent element mounted on said door and enclosing said opening in said door to function as said viewing means for viewing the interior of said rotary hopper, said transparent element being shaped to hold fastener elements therein for supply to said gauging grooves.

16. The rotary hopper according to claim 15 including a recess in said cone, said recess being smaller than an inner diameter of said gauging ring to hold fastener elements for supply to each of said gauging grooves.

17. The rotary hopper according to claim 14 including a recess in said cone, said recess being smaller than an inner diameter of said gauging ring to hold fastener elements for supply to each of said gauging grooves.

18. The rotary hopper according to claim 13 in which:

said movable means includes a door pivotally mounted on said one side of said substantially vertical plate for pivoting about a vertical axis;

and said door has:

an opening;

and a transparent element mounted on said door and enclosing said opening in said door to function as said viewing means for viewing the interior of said rotary hopper, said transparent element being shaped to hold fastener elements therein for supply to said gauging grooves.

19. The rotary hopper according to claim 18 including a recess in said cone, said recess being smaller than an inner diameter of said gauging ring to hold fastener elements for supply to each of said gauging grooves.

20. The rotary hopper according to claim 18 including said door having vertical groove viewing means for viewing said vertical groove in said one side of said substantially vertical plate.

*21. A rotary hopper for fastener elements including:*

*a cone;*

*support means for rotatably supporting said cone;*

*a gauging ring fixed to said cone for rotation therewith;*

*said gauging ring having a plurality of gauging grooves therein, said gauging grooves being angularly spaced around said gauging ring;*

*a cover ring rotatable with said gauging ring so that there is no relative movement therebetween, said cover ring overlying each of said gauging grooves adjacent at least its outlet to form a separate passage for each of said gauging grooves through which a fastener element in each of said gauging grooves can fall therefrom by gravity;*

*receiving means at a fixed position for receiving a fastener element from each of said gauging grooves having a fastener element therein during rotation of said gauging ring by movement of each of said gauging grooves past said receiving means so that a fastener element in each of said gauging grooves may fall by gravity into said receiving means;*

*and preventing means for preventing a fastener element in said passage for each of said gauging grooves from falling therefrom by gravity except when said gauging groove is disposed so that the fastener element therein may fall by gravity into said receiving means.*

*22. The rotary hopper according to claim 21 including access means for providing access to the interior of said rotary hopper.*

*23. The rotary hopper according to claim 22 including viewing means for viewing the interior of said rotary hopper, said viewing means being capable of holding fastener elements for supply to each of said gauging grooves.*

*24. The rotary hopper according to claim 23 in which said access means includes means pivotable about a vertical axis.*

*25. The rotary hopper according to claim 22 in which said access means includes means pivotable about a vertical axis.*

*26. The rotary hopper according to claim 21 including viewing means for viewing the interior of said rotary hopper, said viewing means being capable of holding fastener elements for supply to each of said gauging grooves.*

*27. The rotary hopper according to claim 21 including a recess in said cone, said recess being smaller than an inner diameter of said gauging ring to hold fastener elements for supply to each of said gauging grooves.*

*28. A rotary hopper for fastener elements including:*

*a cone;*

*support means for rotatably supporting said cone;*

*a gauging ring fixed to said cone for rotation therewith;*

*said gauging ring having a plurality of gauging grooves therein, said gauging grooves being angularly spaced around said gauging ring;*

*receiving means at a fixed position for receiving a fastener element from each of said gauging grooves having a fastener element therein during rotation of said gauging ring by movement of each of said gauging grooves past said receiving means so that a fastener element in each of said gauging grooves may fall by gravity into said receiving means;*

*preventing means for preventing a fastener element in said passage for each of said gauging grooves from falling therefrom by gravity except when said gauging groove is disposed so that the fastener element therein may fall by gravity into said receiving means;*

*and means pivotable about a vertical axis for providing access to the interior of said rotary hopper.*

*29. The rotary hopper according to claim 28 including viewing means for viewing the interior of said rotary hopper, said viewing means being capable of holding fastener elements for supply to each of said gauging grooves.*

* * * * *